United States Patent [19]

Kurihara

[11] Patent Number: 5,690,886
[45] Date of Patent: Nov. 25, 1997

[54] METHOD FOR MOLDING A SPEAKER GRILLE

[75] Inventor: Kazumasa Kurihara, Yokohama, Japan

[73] Assignee: Nifco, Inc., Kanagawa-Ken, Japan

[21] Appl. No.: 689,154

[22] Filed: Jul. 30, 1996

Related U.S. Application Data

[62] Division of Ser. No. 408,786, Mar. 23, 1995, Pat. No. 5,623,133.

[30] Foreign Application Priority Data

Apr. 15, 1996 [JP] Japan .................... 6-101956

[51] Int. Cl.$^6$ .......................... G10K 11/00; B29C 45/37
[52] U.S. Cl. .................... 264/328.12; 264/328.1
[58] Field of Search ................ 264/328.1, 328.8, 264/328.12; 181/150, 175

[56] References Cited

U.S. PATENT DOCUMENTS

| | | |
|---|---|---|
| 3,264,396 | 8/1966 | Beesley et al. ............ 264/328.12 |
| 3,767,753 | 10/1973 | Suzuki ...................... 264/328.12 |
| 3,880,978 | 4/1975 | Apostoleris et al. ....... 264/328.12 |
| 4,140,828 | 2/1979 | Copping ................... 264/328.12 |
| 4,331,841 | 5/1982 | Castagna .................... 381/205 |
| 4,434,120 | 2/1984 | Aloisio, Jr. et al. ......... 264/328.12 |
| 4,781,879 | 11/1988 | Oishi ........................ 264/328.12 |
| 4,832,150 | 5/1989 | Just et al. ..................... 181/175 |
| 4,974,698 | 12/1990 | Smith .......................... 181/150 |
| 5,425,629 | 6/1995 | Taniyama ................. 264/328.12 |
| 5,623,133 | 4/1997 | Kurihara ..................... 181/175 |

FOREIGN PATENT DOCUMENTS

| | | |
|---|---|---|
| 0422322 | 4/1991 | European Pat. Off. . |
| 5619496 | 5/1981 | Japan . |
| 5927627 | 8/1984 | Japan . |
| 59-179325 | 10/1984 | Japan ...................... 264/328.12 |

*Primary Examiner*—Jill L. Heitbrink
*Attorney, Agent, or Firm*—Sughrue, Mion, Zinn, Macpeak & Seas, PLLC

[57] ABSTRACT

In a speaker grille formed of a synthetic resin, including a grille plate having a plurality of through holes and a frame integrally formed with the grille plate so as to surround the outer periphery of the grille plate, a ring-shaped groove is formed between the grille plate and the frame so as to extend along the inner periphery of the frame. In molding the speaker grille, the flow of the resin is blocked by a ring-shaped dam provided in a metal mold to form the ring-shaped groove. Accordingly, the speaker grille can be beautifully molded without the generation of appearance defects such as flow mark, weld, and short. Further, in forming through holes also at the boundary between the grille plate and the frame, there is no problem in strength of the metal mold.

2 Claims, 5 Drawing Sheets

METHOD FOR MOLDING A SPEAKER GRILLE

This is a divisional of application Ser. No. 08/408,786 filed Mar. 23, 1995 now, U.S. Pat. No. 5,623,133.

BACKGROUND OF THE INVENTION

1. Field of the Invention

The present invention relates to a speaker grille for covering the surface of an audio speaker installed in an automobile compartment or any other types of speaker. The speaker grille is integrally formed of a synthetic resin to include a grille plate having a plurality of through holes and a frame for supporting the outer periphery of the grille plate. This invention also relates to a molding method for the speaker grille. More particularly, the present invention relates to a speaker grille which can eliminate the generation of appearance defects such as flow mark, weld, and short in molding to thereby obtain a beautiful appearance. It must be molded by using a metal mold advantageous in strength, and also relates to a molding method for the speaker grille.

2. Description of the Related Art

In general, a speaker grille for covering the surface of an audio speaker installed in an automobile compartment or any other types of speaker is constructed of a frame formed of a synthetic resin and punching metal or a metal lattice plate fixed to the frame. Such a speaker grille has disadvantages in parts cost and assembly (mounting) cost because it is composed of a plurality of parts.

Figure 8:
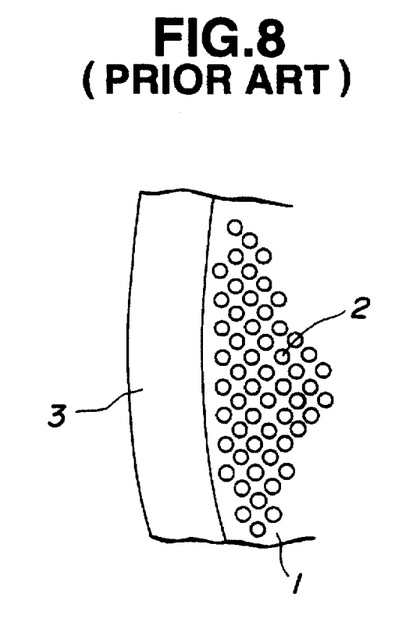
FIG. 8 is a fragmentary plan view of a speaker grille in the related art, showing a front surface thereof.
Figure 9:
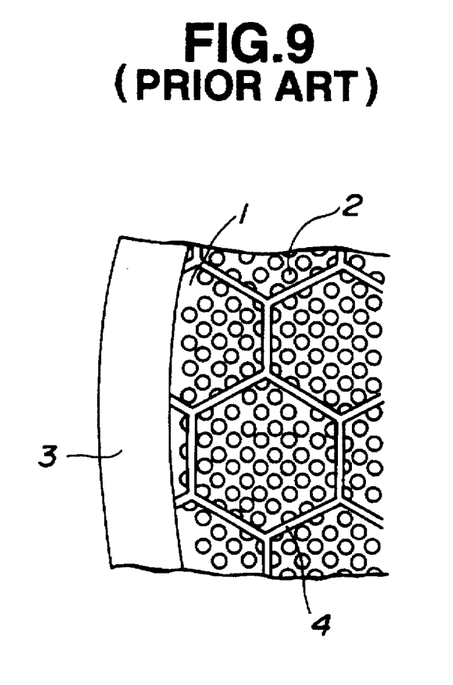
FIG. 9 is a fragmentary plan view of the speaker grille shown in FIG. 8, showing a back surface thereof.

FIG. 8 shows another type of known speaker grille integrally formed of a synthetic resin to include a grille plate 1 having a plurality of through holes 2 and a frame 3 for supporting the outer periphery of the grille plate 1 (such a speaker grille will be hereinafter referred to as an integral speaker grille). In obtaining a relatively large speaker grille of this type as shown in FIG. 9, it is also known that a lattice-shaped reinforcing rib 4 is integrally formed on the back surface of the grille plate 1 to obtain a sufficient strength.

Figure 10:
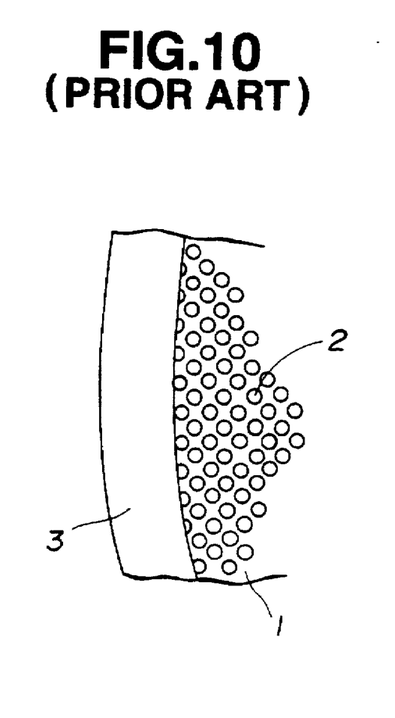
FIG. 10 is a fragmentary plan view of another speaker grille in the related art, similar to FIG. 8.

Further, as shown in FIG. 10, it is also known that the through holes 2 such as punched holes or latticed holes are formed also at the boundary between the grille plate 1 and the frame 3 to make the design of the integral speaker grille similar to that of the speaker grille having a punching metal or a metal lattice plate fixed to the frame.

Such an integral speaker grille is molded by combining an upper mold (a half mold for molding the front surface of the speaker grille) having in its cavity a plurality of pins for forming the through holes 2 and a lower mold (another half mold for molding the back surface of the speaker grille) having in its cavity a groove for forming the reinforcing rib 4 as required, and then injecting a molding resin usually from the lower mold side into the metal mold composed of the upper mold and the lower mold, to avoid that a gate mark (resin injection hole mark) may be left on the front surface of the speaker grille. In some cases, a third metal mold for molding the frame 3 around the grille plate 1 is combined with the combined upper mold and lower mold.

Figure 5:
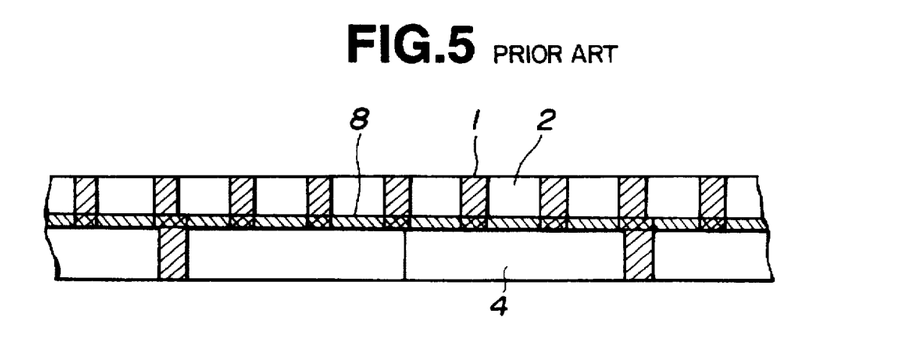
FIG. 5 is a fragmentary enlarged sectional view of a speaker grille in the related art.

Further, the present applicant has already proposed another type of integral speaker grille (Japanese Patent Application No. Hei 5-346365) as shown in FIG. 5. This integral speaker grille further includes a sound transmitting sheet 8 integrally provided between the grille plate 1 and the reinforcing rib 4. The speaker grille as shown in FIG. 5 is formed by disposing the sound transmitting sheet 8 such as a sheet of nonwoven fabric, woven fabric, or knitted fabric between the lower mold having the groove for forming the reinforcing rib 4 and the upper mold having the plural pins, and then injecting a molding resin from the lower mold side to pass the resin through the sheet to fill the cavity defined by the upper mold and the lower mold with the resin.

However, these integral speaker grilles in the related art have a problem in moldability. That is, appearance defects such as flow mark, weld, and short are prone to generate in molding the speaker grille. Specifically, since the plural pins for forming the punched holes or the latticed holes each having a small size are present in the cavity of the metal mold for molding the speaker grille, the molding resin injected from the lower mold side receives a large resistance during flowing in the cavity, causing insufficient filling of the cavity with the molding resin. As a result, short (cutout) is generated at a portion for forming the through holes of the grille plate, or weld and flow mark (marks of resin flow) are generated on the frame at many positions. Thus, the Problem in appearance of the speaker grille is prone to occur.

Figure 7:
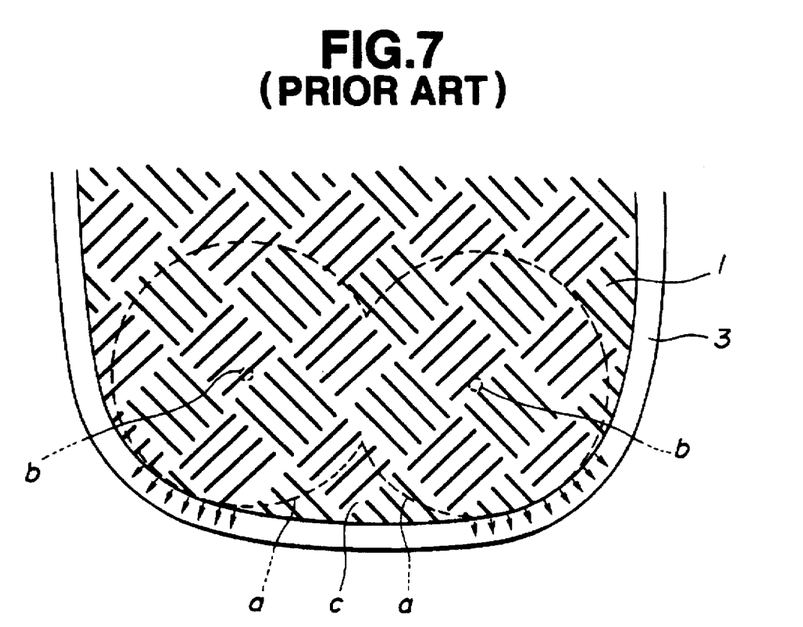
FIG. 7 is a view similar to FIG. 6, illustrating the flow of resin in molding a speaker grille in the related art.

This problem will now be described in more detail. In obtaining the speaker grille having the reinforcing rib 4 on the back surface of the grille plate 1 as shown in FIG. 9, the resin is charged from a central portion of the lower mold at several positions into the cavity of the metal mold. At this time, the resin is allowed to flow fast in the groove for forming the reinforcing rib 4 in the lower mold, which is lower in flow resistance than the upper mold having the plural pins. Accordingly, the resin flowing in the groove for forming the reinforcing rib 4 in the lower mold early reaches a frame forming portion around a grille plate forming portion, and the frame forming portion is filled with resin earlier than the grille plate forming portion. Thereafter, the grille plate forming portion in the upper mold is filled with resin. At this time, as shown in FIG. 7, the resin a lately reached the outer periphery of the grille plate 1, as shown by reference characters, flows into the frame forming portion already filled with the resin (see small arrows in FIG. 7), thus causing the generation of weld and flow mark. Furthermore, since the resin a flowing in the upper mold tends to flow from a portion where it has reached the outer periphery of the grille plate 1 into the frame forming portion, the resin a is not spread enough to a portion shown by reference character c in FIG. 7 where the flows of the resin a radially spread from resin injecting gates b are not overlapped each other. Accordingly, the portion c is not filled enough with the resin a, causing the generation of short (cutout). In the speaker grille having the sound transmitting sheet 8 between the grille plate 1 and the reinforcing rib 4 as shown in FIG. 5, the sheet 8 increases the flow resistance to cause a large difference in flow speed of the resin between the upper mold and the lower mold, which makes more remarkable the generation of weld, flow mark, and short.

Further, a similar problem sometimes occurs also in the speaker grille not having the reinforcing rib 4 on the back surface of the grille plate 1 not so frequently as in the speaker grille having the reinforcing rib 4. Specifically, the resin charged from the central portion of the lower mold into the cavity in molding the speaker grille not having the reinforcing rib 4 is radially outwardly spread. At this time, the resin is not always uniformly spread in such a manner as to be spread fast at a certain portion, for example, elliptically spread. Accordingly, the resin reaching the frame early forming portion flows into the frame forming portion having a low flow resistance, and the frame forming portion is filled with the resin. Thereafter, the grille plate forming portion is filled with the resin, resulting in the occurrence of the similar problem.

In addition to the problem in moldability of the integral speaker grille as mentioned above, there is another problem in handlability of the metal mold in obtaining the speaker grille having the through holes 2 also at the boundary between the grille plate 1 and the frame 3 as shown in FIG. 10. That is, the pins for forming the through holes 2 at the boundary between the grille plate 1 and the frame 3 are very thin so that each pin has a semicircular shape in cross section or the like. Accordingly, in removing a molding from the metal mold, the pins are prone to break.

SUMMARY OF THE INVENTION

It is accordingly an object of the present invention to provide a speaker grille and a molding method therefor which can prevent the generation of appearance defects such as flow mark, weld, and short and thereby obtain a beautiful appearance.

It is another object of the present invention to provide a speaker grille and a molding method therefor which can eliminate the problem in strength of a metal mold even when forming through holes also at the boundary between the grille plate and the frame.

According to one aspect of the present invention, there is provided in a speaker grille formed of a synthetic resin, comprising a grille plate having a plurality of through holes and a frame integrally formed with the grille plate so as to surround an outer periphery of the grille plate; the improvement further comprising a ring-shaped groove formed between the grille plate and the frame so as to extend along an inner periphery of the frame.

The grille plate having the through holes may be in any forms including the forms of punching metal and lattice plate. A lattice-shaped reinforcing rib may be integrally formed on the back surface of the grille plate. A sound transmitting sheet may be provided between the grille plate and the reinforcing rib so as to spread along the surface of the grille plate, wherein the sheet is integrated with the grille plate and the reinforcing rib by passing the synthetic resin for forming the grille plate and the synthetic resin for forming the reinforcing rib through the sheet, whereby the through holes of the grille plate may be closed by the sheet. Further, the through holes formed at the outer peripheral edge of the grille plate may or may not intersect the ring-shaped groove.

According to another aspect of the present invention, there is provided in a molding method for a speaker grille formed of a synthetic resin, the speaker grille comprising a grille plate having a plurality of through holes and a frame integrally formed with the grille plate so as to surround an outer periphery of the grille plate, the speaker grille being molded by charging the synthetic resin into a metal mold having a cavity provided with a grille plate forming portion having a plurality of pins for forming the through holes and also provided with a frame forming portion around the grille plate forming portion; the improvement wherein a ring-shaped dam for blocking flow of the molding resin in the metal mold is provided at a boundary between the grille plate forming portion and the frame forming portion of the cavity so as to surround the pins.

The metal mold may be a metal mold separated into an upper mold for forming a front surface of the speaker grille and a lower mold for forming a back surface of the speaker grille. The plural pins and the dam may be provided in the upper mold, and a lattice-shaped groove for forming the lattice-shaped reinforcing rib may be formed in the lower mold, thereby molding a speaker grille comprising the grille plate having the through holes and the frame integrally formed with the grille plate so as to surround the outer periphery of the grille plate, and further comprising the reinforcing rib formed on the back surface of the grille plate. Further, a speaker grille further comprising a sound transmitting sheet integrally provided between the grille plate and the reinforcing rib may be obtained by disposing the sheet between the upper mold and the lower mold.

As described above, the speaker grille of the present invention is a speaker grille formed of a synthetic resin, comprising a grille plate having a plurality of through holes and a frame integrally formed with the grille plate so as to surround the outer periphery of the grille plate, wherein a ring-shaped groove is formed between the grille plate and the frame to extend along the inner periphery of the frame. The speaker grille is molded by combining an upper mold having in its cavity a plurality of pins for forming the through holes and a ring-shaped dam for forming the ring-shaped groove, and a lower mold having in its cavity a lattice-shaped groove for forming a reinforcing rib as required, then injecting a molding resin from the lower mold side into the cavity of the metal mold composed of the upper mold and the lower mold, and filling the cavity of the metal mold with resin. In some cases, a third metal mold for forming the frame may be combined with the combined upper mold and lower mold.

In the speaker grille of the present invention, the ring-shaped groove is formed between the grille plate having the plural through holes and the frame. Accordingly, the ring-shaped dam for forming the ring-shaped groove is provided in the cavity of the upper mold for molding the speaker grille in such a manner as to surround the plural pins for forming the plural through holes. In obtaining the speaker grille having the reinforcing rib on the back surface of the grille plate, the molding resin charged from the lower mold side is allowed to flow fast in the groove for forming the reinforcing rib in the lower mold lower in flow resistance than the upper mold having the plural pins. Then, this flow of the molding resin reaches the frame forming portion of the lower mold early, and the frame forming portion is filled with the resin blocked by the ring-shaped dam. On the other hand, after the frame forming portion is filled with the resin having flown in the lower mold, the resin slowly flowing in the upper mold having a large flow resistance lately reaches the outer peripheral edge of the grille plate and is blocked by the ring-shaped dam. Accordingly, there is no possibility that the resin flowing in the upper mold may flow into the frame forming portion which has already been filled with the resin, thus preventing the generation of weld and flow mark. Further, the resin flowing in the upper mold is blocked around the grille plate by the ring-shaped dam formed in the upper mold. Therefore, the resin is allowed to reach all over the outer peripheral edge of the grille plate, thus preventing the generation of short.

In molding the speaker grille not having the reinforcing rib on the back surface of the grille plate, the plural pins for forming the through holes extend between the inner surface of the upper mold and the inner surface of the lower mold in the cavity of the metal mold, so that there is no difference in flow resistance of the resin between the upper mold and the lower mold. In this case, the resin is allowed to first pass through the grille plate forming portion (the portion provided with the plural pins projecting) having a large flow resistance, and is allowed to next reach the frame forming portion having a small flow resistance. Prior to reaching the frame forming portion, the flow of the resin is once blocked by the ring-shaped dam to completely fill the grille plate forming portion with the resin under a sufficient pressure. Thereafter, the frame forming portion having a small flow resistance is filled with resin. Thus, there is no possibility that resin may flow into the frame forming portion before the grille plate forming portion is completely filled with the resin, causing a reduction in pressure and insufficient filling of the frame forming portion with the resin, thereby securely preventing the generation of short, weld, and flow mark.

As proposed in Japanese Patent Application No. Hei 5-346365 by the present applicant, a sound transmitting sheet such as a sheet of nonwoven fabric, woven fabric, or knitted fabric may be integrally provided between the grille plate and the reinforcing rib by disposing the sheet between the upper mold and the lower mold, and then charging the resin from the lower mold side to pass the resin through the sheet and fill the cavity defined by the upper mold and the lower mold with resin. In this case, the sheet provides resistance against the flow of the resin to cause a large difference in flow speed of the resin between the upper mold and the lower mold. However, the effect of preventing the generation of short, weld, and flow mark can be made more remarkable owing to the temporary blocking of the resin flow by the ring-shaped dam.

Further, in the speaker grille of the present invention, the through holes may be formed also at the boundary between the grille plate and the frame for supporting the grille plate. As the ring-shaped groove is formed between the grille plate and the frame to extend along the inner peripheral edge of the frame, the through holes formed at the boundary between the grille plate and the frame intersect the ring-shaped groove. Accordingly, the pins provided in the upper mold to form the through holes at the outer peripheral edge of the grille plate (i.e., the through holes intersecting the ring-shaped groove) are made integral with the dam for forming the ring-shaped groove. Therefore, even if each pin for forming each through hole intersecting the groove is very thin so as to have a semicircular shape in cross section, for example, it has a sufficient strength. Accordingly, in removing the molding from the metal mold, the pins are prevented from being broken, thus improving the handlability of the metal mold in molding.

It is to be noted that the upper mold and the lower mold are a pair of half molds constituting the metal mold but not always mean that the half molds are disposed in vertically positional relationship. In the present invention, the half mold for molding the front surface of the speaker grille is referred to as the upper mold, and the half mold for molding the back surface of the speaker grille is referred to as the lower mold. Further, the cavity for forming the frame around the grille plate may be defined by combining the upper mold and the lower mold. Alternatively, this cavity may be defined by combining a third metal mold for forming the frame around the combined upper and lower molds.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1A:
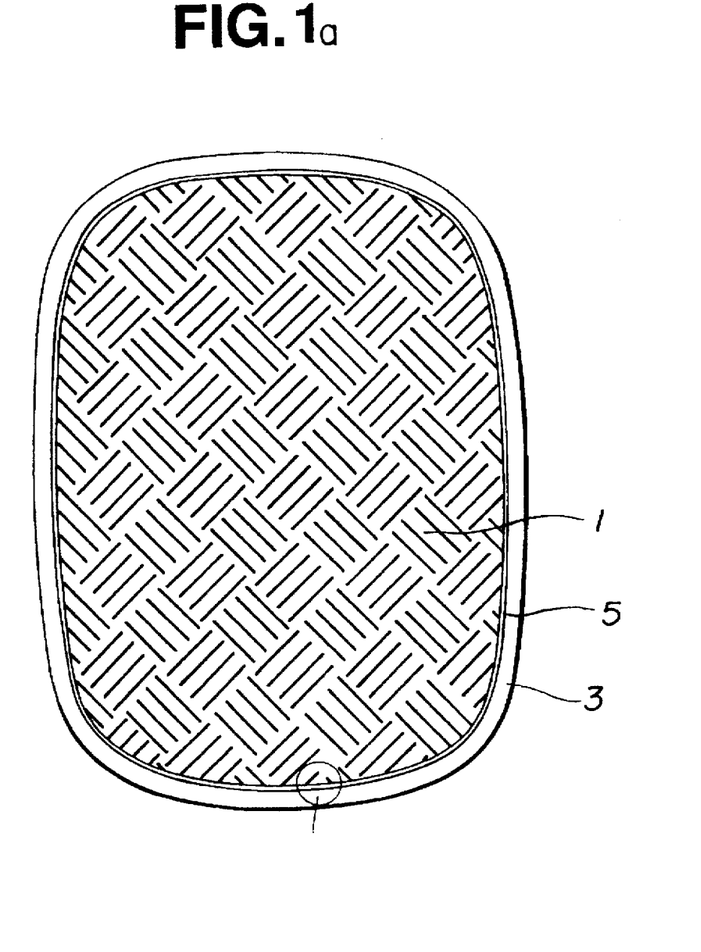
FIG. 1A is a plan view of a speaker grille according to a preferred embodiment of the present invention, showing a front surface thereof, with FIG. 1B being an enlarged view of a part of the front surface also shown.
Figure 1B:
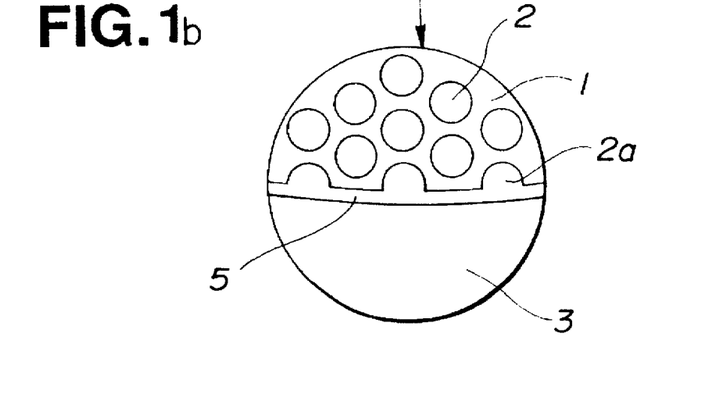
Figure 2A:
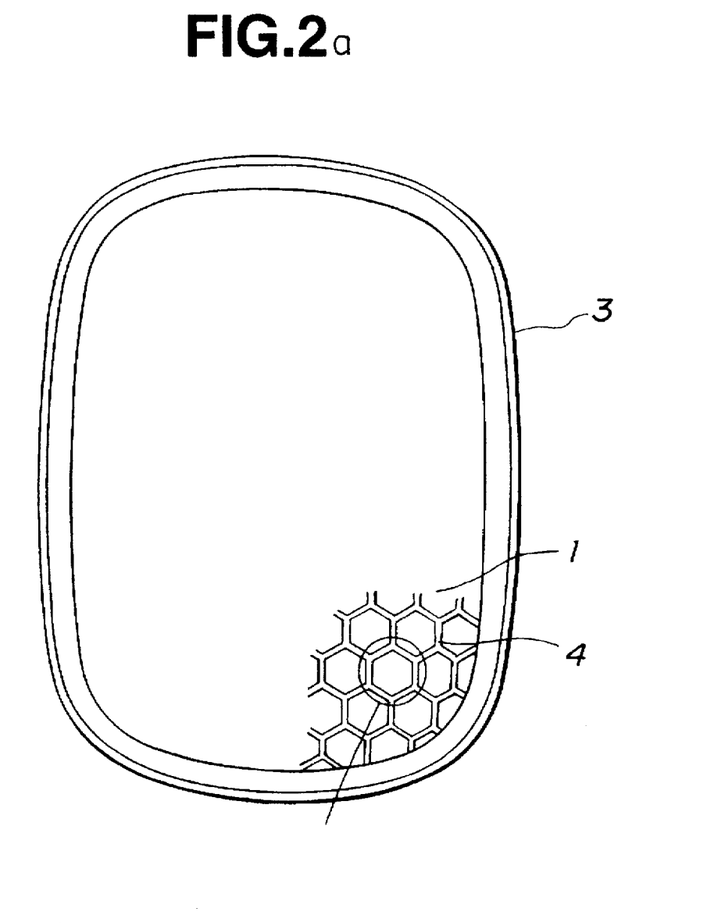
FIG. 2A is a plan view of the speaker grille, showing a back surface thereof, with FIG. 2B being an enlarged view of a part of the back surface also shown.
Figure 2B:
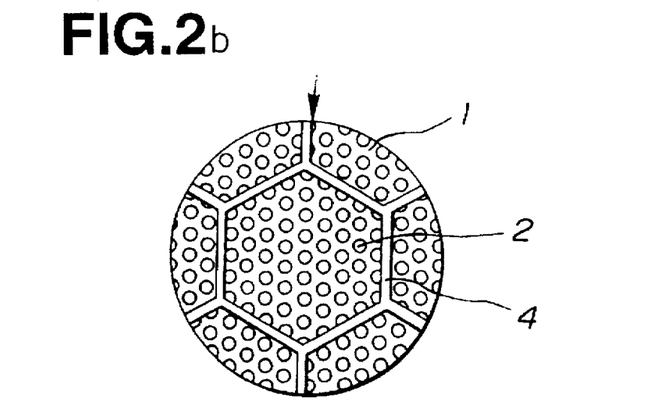
Figure 3:
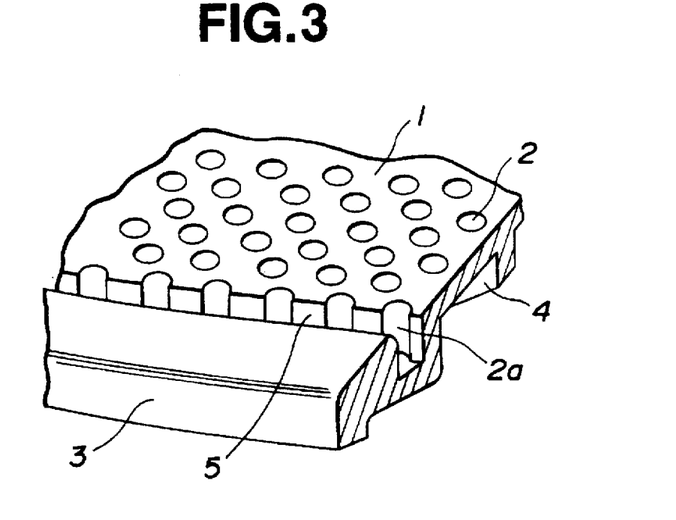
FIG. 3 is a fragmentary perspective view, partially in section, of the speaker grille.

FIGS. 1 to 3 show a speaker grille according to a preferred embodiment of the present invention. Referring to FIGS. 1 to 3, reference numeral 1 denotes a substantially rectangular thin grille plate through which a plurality of punched holes (through holes) 2 are formed. A substantially rectangular ring-shaped frame 3 is integrally formed with the outer periphery of the grille plate 1. As shown in FIG. 2A, a relatively large hexagonal lattice-shaped reinforcing rib 4 is integrally formed on the whole back surface of the grille plate 1. The reinforcing rib 4 is integrally connected with the inner peripheral edge of the frame 3.

As shown in FIG. 1B, a ring-shaped groove 5 is formed on the front surface of the speaker grille between the grille plate 1 and the frame 3 along the inner peripheral edge of the frame 3. As shown in FIGS. 1B and 3, a plurality of punched holes 2a are formed at the outer peripheral edge of the grille plate 1 so as to intersect the ring-shaped groove 5.

The grille plate 1, the frame 3, and the reinforcing rib 4 are integrally formed from a synthetic resin. The synthetic resin to be used for molding may be any synthetic resin that can be subjected to injection molding. In particular, a synthetic resin superior in flowability during injection is preferably used. Specifically, a crystalline resin such as polyacetal and polypropylene is preferably used.

The speaker grille is manufactured by combining a half mold (upper mold) for molding the front surface (the surface shown in FIG. 1A), i.e., an upper mold having in its cavity a plurality of pins for forming the punched holes 2 and a ring-shaped dam for forming the ring-shaped groove 5, and another half mold (lower mold) for molding the back surface (the surface shown in FIG. 2A), i.e., a lower mold having in its cavity a hexagonal lattice-shaped groove for forming the reinforcing rib 4, then injecting a molding resin from a central portion of the lower mold into the cavity of the metal mold composed of the upper mold and the lower mold, so as to avoid that a gate mark (resin injection hole mark) may be left on the front surface of the speaker grille, and then filling the cavity with the resin injected. The frame 3 may be molded by combining the upper mold and the lower mold to define a cavity for forming the frame 3. Alternatively, the frame 3 may be molded by combining the upper mold and the lower mold and further combining a third metal mold having a cavity for forming the frame 3 around the combined upper and lower molds.

In the speaker grille according to this preferred embodiment, the ring-shaped groove 5 is formed between the grille plate 1 having the plural punched holes 2 and the frame 3. Accordingly, the ring-shaped dam for forming the ring-shaped groove 5 is provided in the cavity of the upper mold for molding the speaker grille in such a manner as to surround the plural pins for forming the plural punched holes 2. In molding the speaker grille, the molding resin charged from the lower mold side is allowed to fast flow in the groove for forming the reinforcing rib 4 in the lower mold lower in flow resistance than the upper mold having the plural pins. Then, this flow of the molding resin reaches the cavity early for forming the frame 3 and this cavity is filled with the resin blocked by the ring-shaped dam. On the other hand, after the cavity for forming the frame 3 is filled with the resin having flowed in the lower mold, the resin slowly flowing in the upper mold having a large flow resistance then reaches the outer peripheral edge of the grille plate 1 and is blocked by the ring-shaped dam. Accordingly, there is no possibility that the resin flowing in the upper mold may flow into the cavity for forming the frame 3 which cavity has already been filled with the resin, thus preventing the generation of weld and flow mark.

Figure 6:
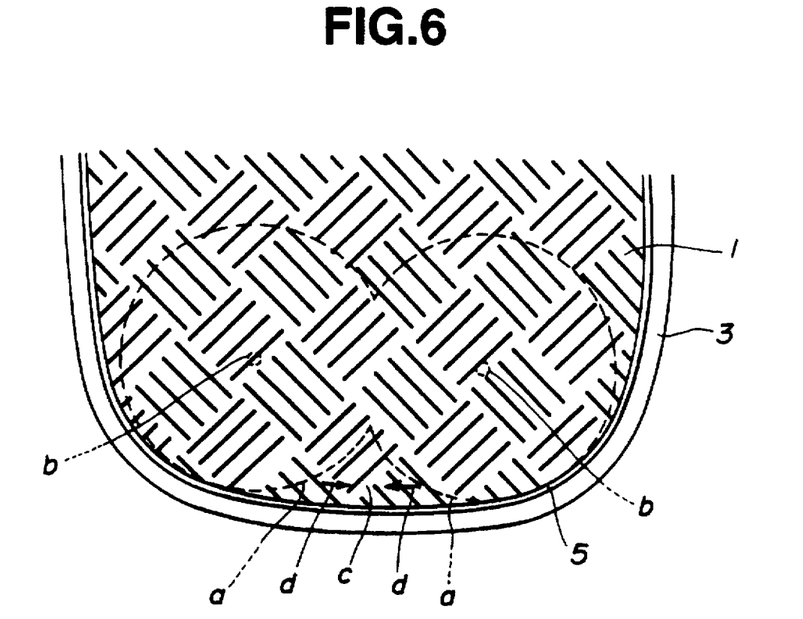
FIG. 6 is a fragmentary plan view of the speaker grille, illustrating the flow of resin in molding the speaker grille of the present invention.

Further, the resin flowing in the upper mold is blocked around the grille plate 1 by the ring-shaped dam formed in the upper mold. Therefore, as shown in FIG. 6, after reaching the outer peripheral edge of the grille plate 1, the resin is not allowed to flow into the cavity for forming the frame 3, but the resin is urged around by a sufficient pressure (see arrows d in FIG. 6) and reaches all over the outer peripheral edge of the grille plate 1 (e.g., a portion shown by reference character c in FIG. 6), thus preventing the generation of short.

Figure 4:
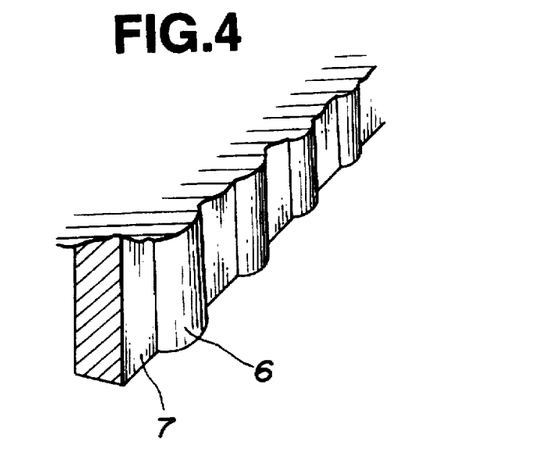
FIG. 4 is a fragmentary perspective view, partially in section, of a metal mold to be used in molding the speaker grille.

Further, in the speaker grille according to this preferred embodiment, the punched holes 2a are formed at the boundary between the grille plate 1 and the frame 3 as mentioned above, thus providing a superior design like that of a speaker grille having a punching metal mounted to a frame. As the ring-shaped groove 5 is formed between the grille plate 1 and the frame 3 so as to extend along the inner peripheral edge of the frame 3, the punched holes 2a formed at the boundary between the grille plate 1 and the frame 3 intersect the ring-shaped groove 5. Accordingly, as shown in FIG. 4, a plurality of pins 6 provided in the upper mold to form the punched holes 2a are made integral with the dam 7 provided in the upper mold for forming the groove 5. Therefore, even if each pin 6 is very thin to have a semicircular shape in cross section, for example, it has a sufficient strength. Accordingly, in removing the molding (the speaker grille in this preferred embodiment) from the metal mold, the pins 6 are prevented from being broken, thus improving the handlability of the metal mold in molding.

As described above, in the speaker grille according to this preferred embodiment, the provision of the groove 5 between the grille plate 1 and the frame 3 can prevent the generation of appearance defects such as flow mark, weld, and short to thereby obtain a beautiful appearance of the speaker grille. In addition, the punched holes 2a (through holes) are formed also at the boundary between the grille plate 1 and the frame 3 with no problem in strength of the metal mold, thereby securely obtaining a superior design of the speaker grille.

It is to be noted that the speaker grille and the molding method therefor according to the present invention are not limited to the above preferred embodiment, but various modifications may be made without departing from the scope of the present invention. For example, the reinforcing rib 4 formed on the back surface of the grille plate 1 is not essential in the present invention, but it may be omitted as in a relatively small speaker that can obtain a sufficient strength only with the frame 3 surrounding the grille plate 1. In molding such a speaker grille not having the reinforcing rib 4 according to the present invention, the plural pins for forming the through holes extend between the inner surface of the upper mold and the inner surface of the lower mold in the cavity of the metal mold, so that there is no difference in flow resistance of the resin between the upper mold and the lower mold. The resin is allowed to first pass through the grille plate forming portion (the portion provided with the plural pins projecting) having a large flow resistance, and is allowed to next reach the frame forming portion having a small flow resistance. Prior to reaching the frame forming portion, the flow of the resin is once more blocked by the ring-shaped dam to completely fill the grille plate forming portion with the resin under a sufficient pressure. Thereafter, the frame forming portion having a small flow resistance is filled with resin. Thus, there is no possibility that resin may flow into the frame forming portion and be charged therein before the grille plate forming portion is completely filled with the resin, thereby preventing the generation of defects such as short, weld, and flow mark.

Further, this invention may use the structure as shown in FIG. 5, with a sound transmitting sheet 8 such as a sheet of nonwoven fabric, woven fabric, or knitted fabric provided between the grille plate 1 and the reinforcing rib 4 formed on the back surface thereof to spread along the surface of the speaker grille. As proposed in Japanese Patent Application No. Hei 5-346365 by the present applicant, the sound transmitting sheet 8 may be integrally provided between the grille plate 1 and the reinforcing rib 4 by disposing the sheet 8 such as a sheet of nonwoven fabric, woven fabric, or knitted fabric between the upper mold and the lower mold and charging the resin from the lower mold side to pass the resin through the sheet 8 and fill the cavity defined by the upper mold and the lower mold With the resin. In this case, the sheet 8 provides resistance against the flow of the resin to cause a large difference in flow speed of the resin between the upper mold and the lower mold. However, the effect of preventing the generation of short, weld, and flow mark can be made more remarkable owing to the temporary blocking of the resin flow by the ring-shaped dam.

Although the punched holes (through holes) 2a intersecting the ring-shaped groove 5 are formed between the grille plate 1 and the frame 3 in the above preferred embodiment, the through holes intersecting the groove 5 are not essential in the present invention. Further, the through holes 2 of the grille plate 1 may have many forms other than the form of punched holes, such as the forms of cross lattice and inclined lattice. Further, the reinforcing rib 4 may also have various forms such a cross lattice, vertical lattice, horizontal lattice, and circular lattice. Also in the other configurations, various modifications may be made within the scope of the present invention.

As described above, the speaker grille of the present invention is provided with the groove between the grille plate and the frame, thereby improving the characteristics of charging of resin into the metal mold during molding to prevent the generation of appearance defects such as flow mark, weld, and short and obtain a beautiful appearance of the speaker grille. Furthermore, even when forming the through holes also at the boundary between the grille plate and the frame, the through holes can be securely formed at the boundary between the grille plate and the frame with no problem in strength of the metal mold, thereby improving the design of the speaker grille. Further, according to the molding method for the speaker grille of the present invention, the speaker grille having the above advantages can be securely obtained.

What is claimed is:

1. In a molding method for a speaker grille formed of a synthetic resin, said speaker grille comprising; a grille plate having a plurality of through holes and a frame integrally formed with said grille plate to surround an outer periphery of said grille plate, said speaker grille being molded by charging said synthetic resin into a metal mold having a cavity provided with a grille plate forming portion having a plurality of pins for forming said through holes and also provided with a frame forming portion around said grille plate forming portion; a ring-shaped dam for blocking flow of said molding resin in said metal mold is provided at a boundary between said grille plate forming portion and said frame forming portion of said cavity to surround said pins.

2. A molding method for a speaker grille according to claim 1, wherein said metal mold comprises an upper mold for forming a front surface of said speaker grille and a lower mold for forming a back surface of said speaker grille, said upper mold having a cavity provided with said pins and said dam, said lower mold having a cavity provided with a lattice-shaped groove for forming a lattice-shaped reinforcing rib, said molding resin being charged from a central portion of said lower mold into said metal mold, whereby said resin is allowed to fast flow in said groove of said lower mold having a small flow resistance and then reach said frame forming portion, and is then blocked by said dam to thereby prevent said resin from flowing from said frame forming portion into said grille plate forming portion, whereas said resin is allowed to slowly flow in said grille plate forming portion of said upper mold having a large flow resistance and then reach said frame forming portion, and is then blocked by said dam to thereby prevent said resin from flowing from said grille plate forming portion into said frame forming portion, thus finally filling said cavity of said metal mold with said resin to thereby mold said speaker grille comprising said grille plate having said pins and said frame integrally formed with said grille plate so as to surround the outer periphery of said grille plate, said reinforcing rib being formed on the back surface of said grille plate.

* * * * *